UNITED STATES PATENT OFFICE.

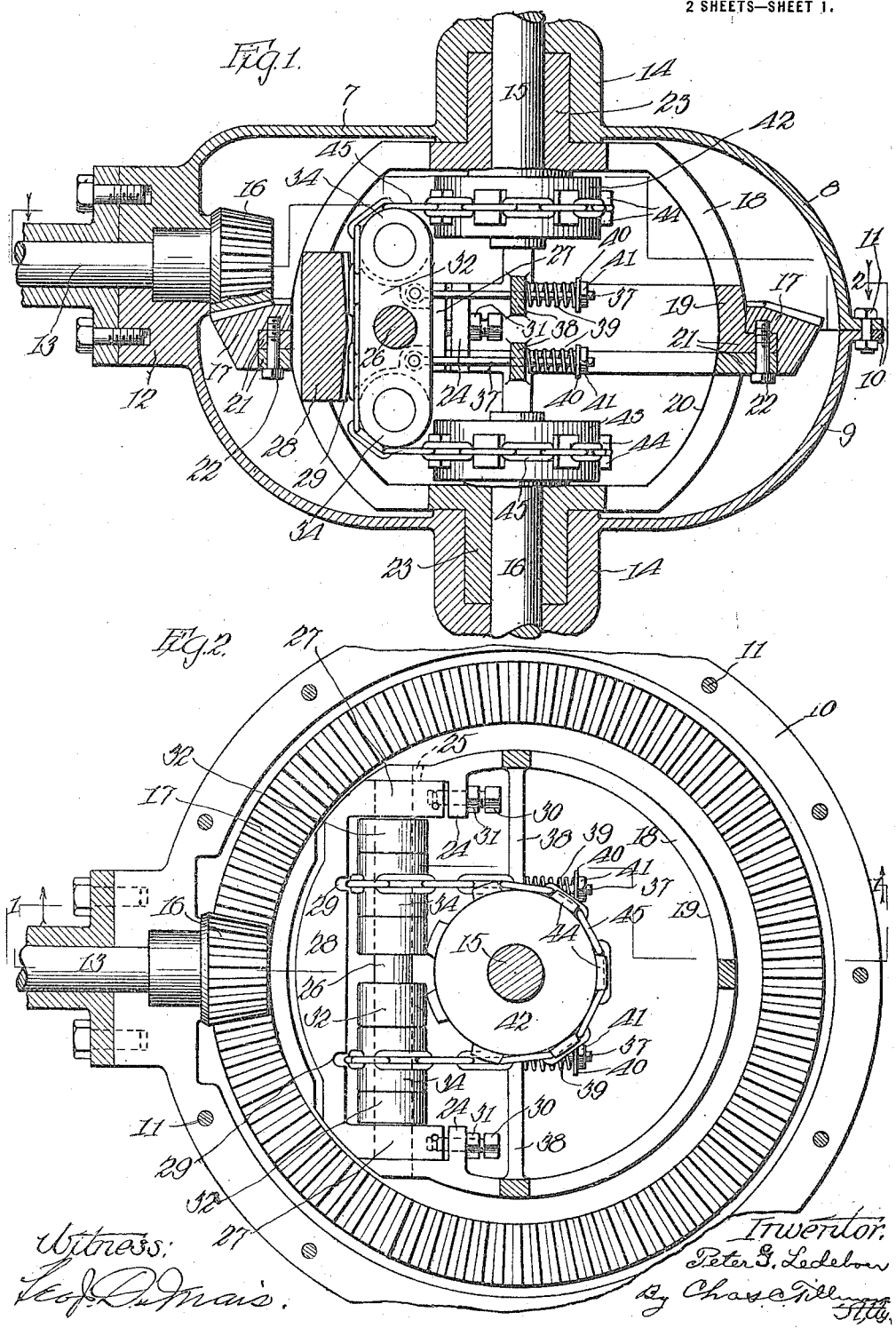

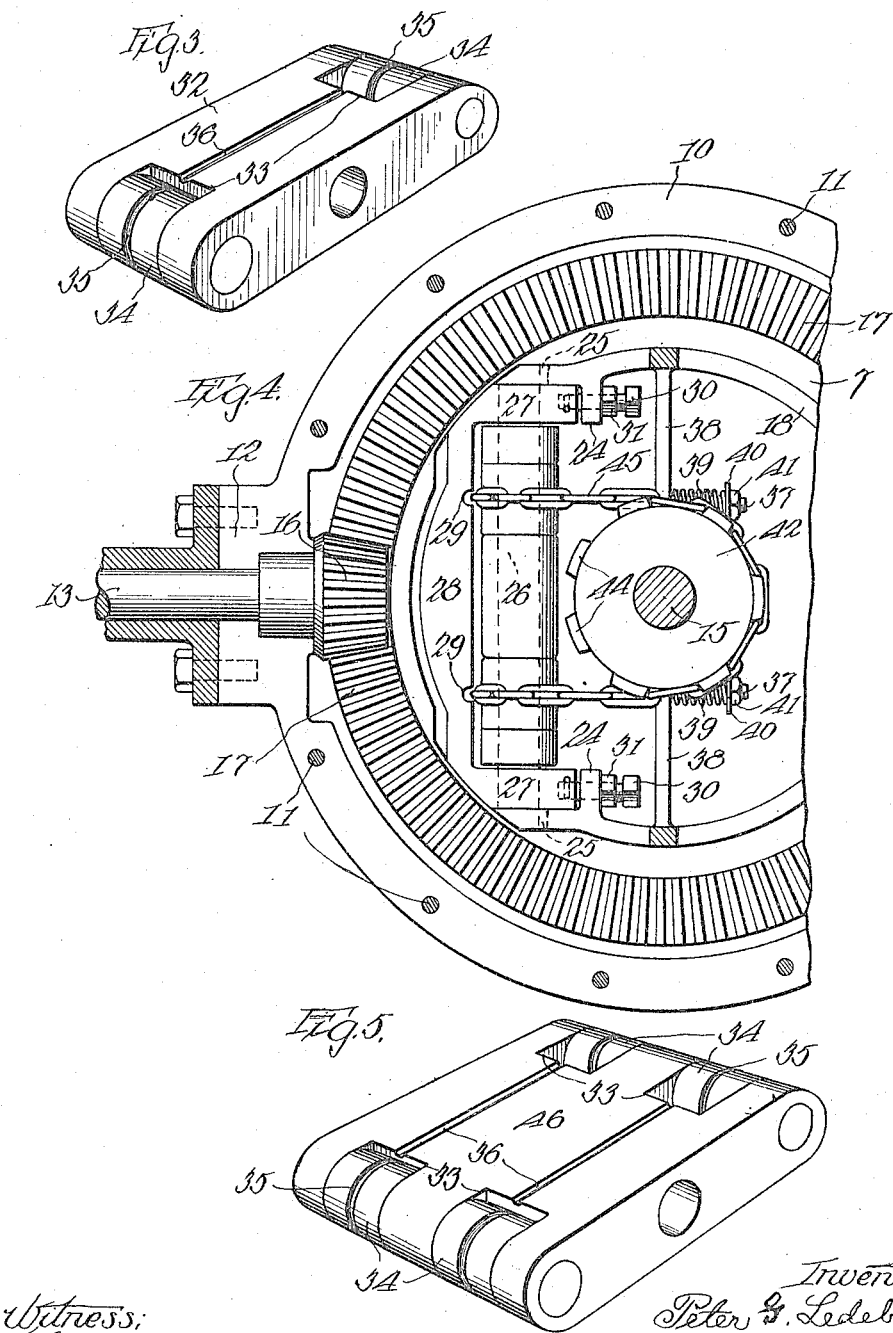

PETER G. LEDEBOER, OF CHICAGO, ILLINOIS, ASSIGNOR OF ONE-HALF TO HENRY MISOSTOW, OF CHICAGO, ILLINOIS.

DIFFERENTIAL GEAR.

1,202,395.  Specification of Letters Patent.  Patented Oct. 24, 1916.

Application filed March 11, 1916. Serial No. 83,461.

*To all whom it may concern:*

Be it known that I, PETER G. LEDEBOER, a citizen of the United States, and resident of Chicago, in the county of Cook and State of Illinois, have invented certain new and useful Improvements in Differential Gear, of which the following is a specification.

This invention relates to certain new and useful improvements in differential gears, and has particular relation to said type of gears used in connection with the two part or sectional rear axle of an automobile, although, I desire it to be understood, that, I do not wish to be limited thereto in the application or use of the invention, as I may employ it for any purpose where it may be applicable for use, and it consists in certain peculiarities of the construction, novel arrangement and operation of the various parts thereof as will be hereinafter more fully set forth and specifically claimed.

The principal object of the invention is to provide a differential mechanism of the above named general character, which shall be extremely simple and inexpensive in construction, strong, durable and efficient in operation. Other objects and advantages of the invention will be disclosed in the subjoined description and explanation.

In the accompanying drawings, which serve to illustrate an embodiment of the invention, Figure 1 is a plan sectional view of the device, taken on line 1—1 of Fig. 2 looking in the direction indicated by the arrows. Fig. 2. is a vertical sectional view taken on line 2—2 of Fig. 1 looking in the direction indicated by the arrows. Fig. 3 is a detached perspective view of one of the pulley or sheave carrying-members of the locking mechanism for the gear chain or connection. Fig. 4 is a similar view to Fig. 2 taken on the same sectional line but illustrating a modification in the construction of the locking mechanism of the gear and Fig. 5 is a detached perspective view of the pulley or sheave carrying member of the modified form of the lock mechanism illustrated in Fig. 4.

Like numerals of reference refer to corresponding parts throughout the different views of the drawings.

The reference numeral 7 designates as a whole the housing or casing for the various parts of the device, which housing is, by preference, substantially elliptical in shape as shown, and consists of two hollow members 8 and 9, each of which has at its edge an outwardly extended flange 10, which are secured together by means of screw bolts 11 extended through suitable openings in said flanges. At a suitable point on its periphery, the housing 7 is provided with a journal box 12 in which is journaled one end of the driving shaft 13 which has power imparted thereto by means of an engine, not shown. Each of the members 8 and 9 of the housing is provided about centrally thereon with a hollow journal box 14 through which the driven shafts or axle sections 15 and 16 are extended within the housing. Mounted on the driving shaft 13 and located within the housing is a beveled gear 16 which meshes with a similar gear 17 carried on the periphery of a spider frame, which is designated as a whole by the reference numeral 18. This spider frame is substantially circular and includes two castings or members 19 and 20, each of which has at its meeting edge an external flange 21 which are secured together by bolts 22, which are extended through suitable openings in said flanges and engage the gear 17 and thus also serve as fastening devices for said gear. Each of the members 19 and 20 of the spider frame 18 is provided centrally on its outer portion with a hub 23 which fit around the driven shafts 15 and 16 or axle sections, and fit into the cavities of the boxes 14 of the housing, as is clearly shown in Fig. 1 of the drawings, in which view it will be understood that the meeting edges of the members 19 and 20 are located in vertical planes, and by reference to Fig. 2 it will be seen and understood that the spider frame 18, when viewed from the side, is segmental in shape and has near the ends of the segment, inwardly extended lugs or projections 24 and outwardly from said lugs or projections, slightly elongated openings 25, in which are journaled the ends of a shaft 26, which shaft is also journaled in the inwardly extended arms or portions 27 of a yoke shaped locking member or plate 28, which has in its surface adjacent to the shaft 26, grooves 29 to receive certain links of the chain of the gear, as will be presently explained.

Seated in each of the lugs or projections 24 is an adjusting screw 30, the inner ends of which are swiveled in the inwardly extended portions or arms 27 of the locking plate 28 and are employed for adjusting the shaft 26 inwardly or outwardly with respect to the driven shafts 15 and 16 for the purpose of taking up any slack in the gear chain which may possibly occur, for it will be understood that by turning the screws 30 in the proper direction, the locking plate 28 will be moved outwardly or inwardly thereby, when it is obvious that the screws may be fixed in the desired position by means of the lock nuts 31 thereon. Mounted on the shaft 26 at their middle portions are a pair of pulley or sheave carrying locking members 32, each of which has in each of its ends, see Figs. 2 and 3 of the drawings, a recess 33, in each of which are journaled a sheave or pulley 34, each of which is provided with a circumferential groove 35, which grooves register with a groove 36 extended longitudinally with respect to the member 32 on the outer surface thereof. The grooves 35 in the sheaves 34 of one of the members 32 and the groove 36 of said member are arranged to register with one of the grooves 29 of the locking plate 28 and the grooves 35 of the sheaves 34 of the other member 32, as well as groove 36 of the last named member are arranged to register or coincide with the other groove 29 of the locking plate 28, as will be readily understood by reference to Figs. 3 and 4 of the drawings. Pivotally secured at one of their ends to the inner portion of each of the members 32 is a pair of rods 37 which are extended loosely through suitable cross bars 38 of the spider frame 18 and each of said rods 37 is equipped with a spring 39, one of which is coiled around each of said rods and has one of its ends resting against one of the bars 38 and its other end against a washer 40 on the rod, which washer is adjustably held in place by means of a nut 41 engaging the rod. These rods and their springs are employed to maintain the locking members 32 in balanced positions or to center said rods on their shaft 26, so that the outer surface of the members 32 will be normally maintained in parallelism with the inner surface of the locking plate 28 of the locking mechanism, which plate and members are slightly separated as is clearly shown in Fig. 2 of the drawings. Mounted on the inner portions of the shafts or axle sections 15 and 16 are wheels 42 and 43 respectively each of which is provided on its periphery with a series of sprockets 44 which are arranged in a pair of circumferential and slightly separated rows on each wheel and are for the purpose of engaging the drive chain 45 in such a way that the links of the chain which are adapted to lie horizontally or in a plane with the peripheries of the wheels will be interposed circumferentially between the sprockets 44, and the links of the chain, which are located at right angles to the peripheries of the wheel will be interposed between the rows of sprockets as will be readily understood by reference to Figs. 1 and 2 of the drawings. This chain is extended around one of the wheels 42 and from thence over the sheaves 34 of one of the locking members 32 and thence around the other wheel 43 and from thence over the sheaves 34 of the other locking member 32 to the wheel 42, thus providing an endless connection, as is apparent, between the sprocket wheels 42 and 43 and axle sections 15 and 16 or driven shafts.

The modification illustrated in Figs. 4 and 5 of the drawings consists in employing a single sheave or pulley carrying member 46, instead of a pair of such members as is shown in the other construction and above described. The member 46 of this modified form is of exactly the same construction as one of the members 32 of the other construction, except that, the modified member 46 is equipped with four pulleys or sheaves 34 arranged in pairs at each end of the member 46, and is provided with two grooves 36 on its outer surface which coincide with the grooves 35 of the pulleys and with the grooves 29 in the outer locking member 28 of the locking mechanism, otherwise the construction in the modification is similar to that shown in Figs. 1 to 3 inclusive, and above described.

From the foregoing and by reference to the drawings it will be readily understood and clearly seen that in the rotation of the shafts or axle sections 15 and 16, that if one of said axles or sections, for instance the axle or section 16 slips or rotates more rapidly by reason of its wheel coming in contact with a slippery surface or for any other reason, the traction of adhesion will be mainly located on the other shaft or axle section 15 and that the tiltable locking means will, by reason of the action of the connection or chain 45 thereon be slightly deflected inwardly at its portion adjacent to the shaft 15, and slightly outwardly at its opposite portion, thus automatically and firmly locking the chain or connection between the tiltable locking means and the plate or member 28 so that the driven shafts or axle sections will be caused to rotate in unison.

Having thus fully described my invention, what I claim as new and desire to secure by Letters Patent is:—

1. The combination with a pair of alined driven shafts, of a differential gearing for driving the same including an endless flexible connection operatively connected to said shafts, a locking member located outwardly of but near the path of travel of said connection, and locking means tiltably mounted in substantial parallelism with the said member and supporting said connection.

2. The combination with a pair of alined driven shafts, of a differential gearing for driving the same including an endless flexible connection operatively connected to said shafts, a locking member located outwardly of but near the path of travel of said connection, said member having ways to receive said connection, and locking means tiltably mounted in substantial parallelism with the said member and supporting said connection and provided with ways to receive the connection.

3. The combination with a pair of alined driven shafts, of a differential gearing for driving the same including an endless flexible connection operatively connected to said shafts, a locking member located outwardly of but near the path of travel of said connection, said member having ways to receive said connection, locking means tiltably mounted in substantial parallelism with the said member and supporting said connection therebetween, and friction reducing means for said connection carried by said tiltable means.

4. The combination with a pair of alined driven shafts, of a differential gearing for driving the same including an endless flexible connection operatively connected to said shafts, a suitably mounted locking member located outwardly of but near the path of travel of said connection, locking means carried by said member and tiltably mounted thereon in substantial parallelism therewith and supporting said connection, and means for adjusting said member outwardly and inwardly with respect to said driven shafts.

5. The combination with a pair of alined driven shafts, of a frame mounted on their adjacent ends, a beveled gear on the periphery of said frame, a driving shaft, a beveled gear on said shaft to mesh with the first named beveled gear, a locking member mounted on said frame and having its inner surface in parallelism with the driven shafts, a sprocket wheel on each of the driven shafts, a locking member tiltably mounted on said frame inwardly of the first named locking member and in substantial parallelism therewith, and a driving connection interposed between said locking members and extended around said wheels.

6. The combination with a pair of alined driven shafts, of a differential gearing for driving the same including an endless flexible connection operatively connected to said shaft, a suitably mounted locking mechanism located outwardly of but near the path of travel of said connection, locking means carried by said member and tiltably mounted thereon and supporting said connection, means connected to said locking means to normally hold it in substantial parallelism with said member, and means for adjusting said member outwardly and inwardly with respect to said driven shafts.

7. The combination with a suitably supported housing, of a driving shaft journaled thereon, a beveled gear on said shaft within said housing, a driven shaft rotatably mounted in opposite sides in said housing and in alinement with one another, a frame mounted on the inner portion of said driven shafts, a beveled gear mounted on the periphery of said frame in mesh with the beveled gear of the driving shaft, a locking member mounted on the frame and having its inner surface in substantial parallelism with the driven shafts, a sprocket wheel on each of the driven shafts, a locking member tiltably mounted on said frame inwardly of the first named locking member and normally held in substantial parallelism therewith, and a driving chain interposed between said locking members and extended around said wheels.

PETER G. LEDEBOER.

Witnesses:
 CHAS. C. TILLMAN,
 A. E. OLSON.

Copies of this patent may be obtained for five cents each, by addressing the "Commissioner of Patents, Washington, D. C."